340-567
SR
2/22/83 XR 4,375,034

United States Patent [19] [11] 4,375,034
Guscott [45] Feb. 22, 1983

[54] PASSIVE INFRARED INTRUSION DETECTION SYSTEM

[75] Inventor: John K. Guscott, Lynnfield, Mass.

[73] Assignee: American District Telegraph Company, New York, N.Y.

[21] Appl. No.: 173,124

[22] Filed: Jul. 28, 1980

[51] Int. Cl.[3] .................................... G01J 1/00

[52] U.S. Cl. .................................... 250/342; 250/353; 340/567; 340/573

[58] Field of Search ............... 250/338, 342, 347, 349, 250/353; 340/567, 573

[56] References Cited

U.S. PATENT DOCUMENTS

| | | | |
|---|---|---|---|
| 3,036,219 | 5/1962 | Thompson | 250/211 R |
| 3,524,180 | 8/1970 | Cruse | 250/349 X |
| 3,631,434 | 12/1971 | Schwartz | 250/349 X |
| 3,703,718 | 11/1972 | Berman | 250/338 X |
| 3,886,360 | 5/1975 | Reiss et al. | 250/353 X |
| 3,886,360 | 5/1975 | Reiss et al. | 250/338 |
| 4,238,675 | 12/1980 | Turlej et al. | 250/342 X |
| 4,271,359 | 6/1981 | Herwig et al. | 250/342 X |

*Primary Examiner*—Davis L. Willis
*Attorney, Agent, or Firm*—Weingarten, Schurgin, Gagnebin & Hayes

[57] ABSTRACT

A passive infrared intrusion detection system having a mirror assembly providing a protective curtain which is relatively narrow in the horizontal plane and which substantially encompasses the vertical space of a protected facility. The mirror assembly includes a focusing mirror and at least one cylindrical mirror which is cooperative with the focusing mirror to provide a relatively large field of view in the vertical plane and a relatively narrow field of view in the horizontal plane. An infrared detector is disposed along the optical axis of the focusing mirror and at the focus thereof to provide electrical signals in response to received radiation from the fields of view. The detector signals are electronically processed to provide an output indication of intruder presence.

26 Claims, 20 Drawing Figures

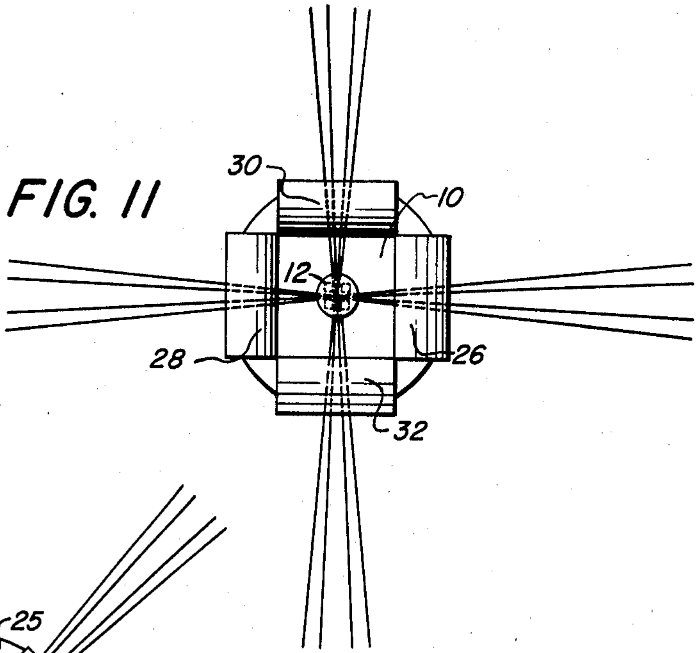
FIG. 11
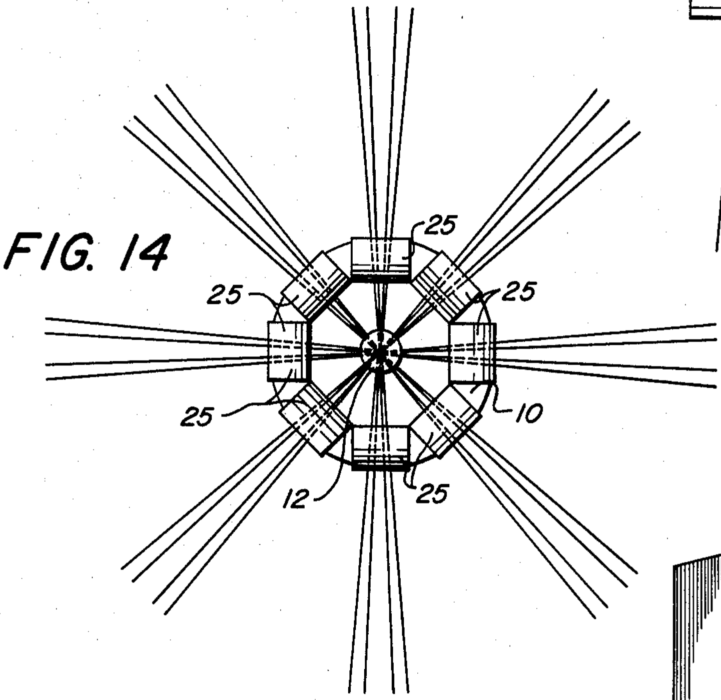
FIG. 14
FIG. 20
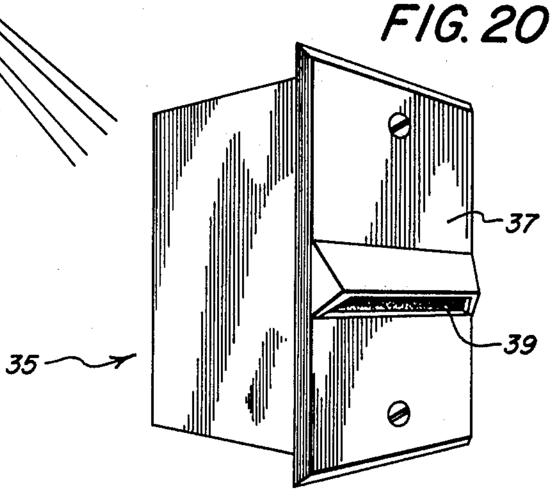
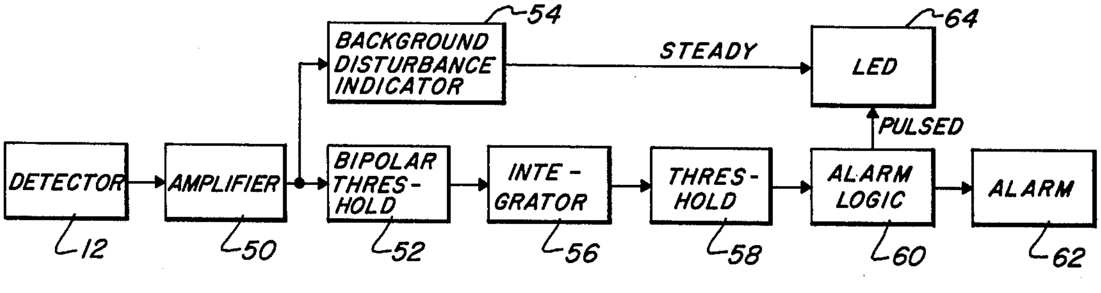
FIG. 15

PASSIVE INFRARED INTRUSION DETECTION SYSTEM

FIELD OF THE INVENTION

This invention relates to intrusion detection systems and more particularly to a passive infrared system for detection of an intruder in a protected space.

BACKGROUND OF THE INVENTION

Passive infrared intrusion detection systems are known for sensing the presence of an intruder in a protected space and providing an output signal representative of intruder detection. Examples of passive infrared intrusion detection systems are shown in U.S. Pat. Nos. 3,036,219; 3,524,180; 3,631,434; 3,703,718; and 3,886,360. It is an object of the present invention to provide a system and a mirror assembly therefor especially suited to ceiling mounting or high wall mounting to produce a protective curtain through which an intruder must pass to gain access to a protected facility.

SUMMARY OF THE INVENTION

Briefly, the present invention provides a passive infrared intrusion detection system having a relatively broad field of view in one plane and a relatively narrow field of view in a transverse plane. The broad field of view is usually in the vertical plane, with the narrow field of view being provided in the horizontal plane such that a curtain of protection is provided. The protective curtain is arranged within a facility being monitored such that an intruder must traverse this curtain to gain entrance into the facility and thereby trigger an intruder alarm. Two or more fields of view can be provided in alternative embodiments of the invention. The system includes a mirror assembly having a focusing mirror and at least one cylindrical mirror which is cooperative with the focusing mirror to provide the viewing field, which is relatively broad in the vertical plane and relatively narrow in the horizontal plane. An infrared detector is disposed along the optical axis of the focusing mirror and at the focus thereof to provide electrical signals in response to received radiation from the field of view. The detector signals are electronically processed to provide an output indication of intruder presence.

DESCRIPTION OF THE DRAWINGS

The invention will be more fully understood from the following detailed description taken in conjunction with the accompanying drawings in which:

FIG. 11 is a top view of the mirror assembly of FIG. 10;

FIG. 14 is a top view of an alternative embodiment providing eight fields of view;

FIG. 15 is a block diagram of signal processing circuitry useful in the invention;

FIG. 20 is a pictorial view of the invention in a typical housing configuration.

DETAILED DESCRIPTION OF THE INVENTION

Figure 1:
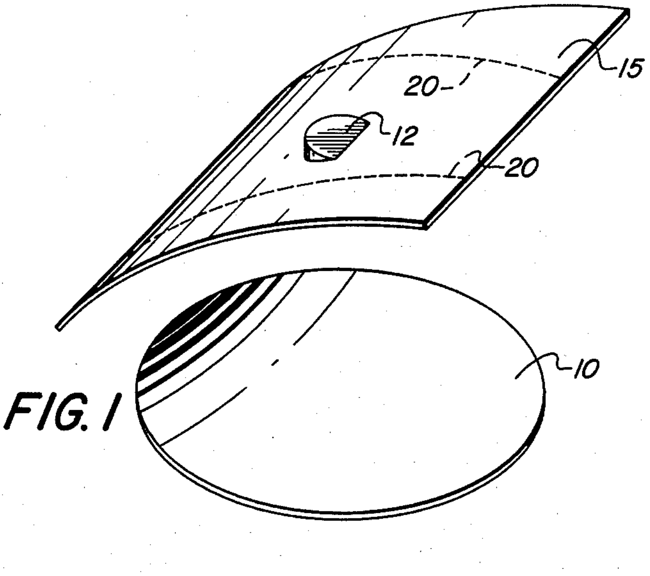
FIG. 1 is a pictorial view of a mirror assembly in accordance with the invention.
Figure 2:
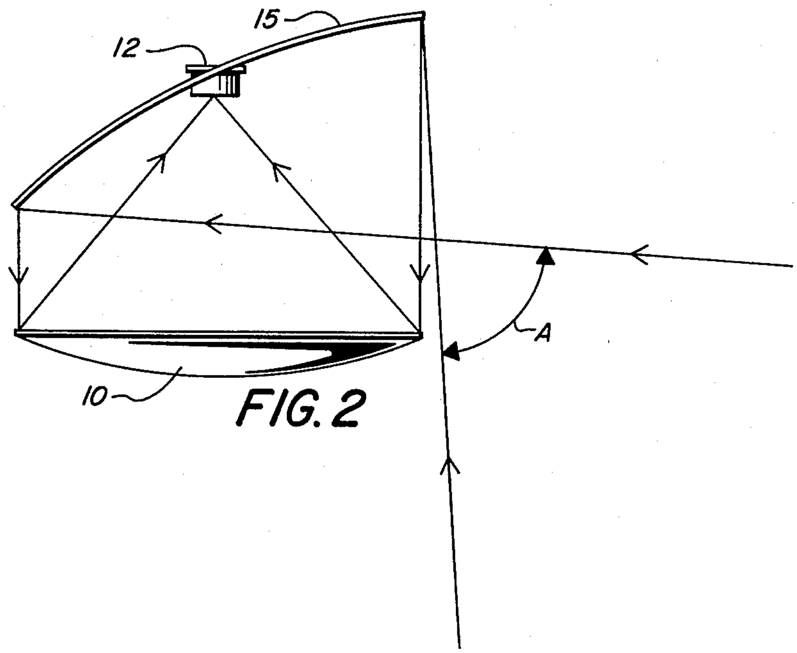
FIG. 2 is an elevation view of the mirror assembly of FIG. 1.

Referring to FIG. 1 and FIG. 2, there is shown in pictorial and elevation views, respectively, a mirror assembly for a passive infrared intrusion detector which includes a focusing mirror 10, an infrared detector 12 disposed along the optical axis of mirror 10 and at the focus thereof, and a cylindrical mirror 15 oriented to provide a predetermined field of view and to cooperate with mirror 10 to direct infrared radiation within the associated field of view to the cooperative portion of mirror 10 and thence to detector 12. Preferably, the mirror 15 has its cylindrical axis orthogonal to the optical axis of mirror 10. The detector 12 is operative to provide electrical signals in response to received infrared radiation and which are electronically processed to provide an output indication of intruder presence.

Figure 3:
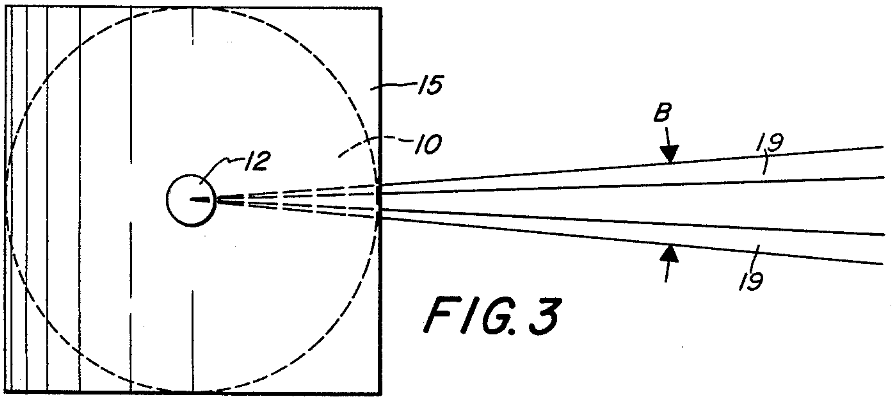
FIG. 3 is a top view of the mirror assembly of FIG. 1.

In typical use, the mirror assembly is oriented with the optical axis of mirror 10 vertical and the axis of mirror 15 horizontal. The cylindrical mirror allows the field of view to be relatively large in the vertical plane, as shown in FIG. 2, and relatively narrow in the horizontal plane, as shown in FIG. 3. The horizontal field of view or divergence angle B is controlled by the focal length of the focusing mirror 10. The curvature of the cylindrical mirror is determined in relation to the curvature of the focusing mirror to provide the intended vertical field of view or vertical divergence angle A. The front and rear edges of the cylindrical mirror determine the limits or extent of the vertical field of view. The forward edge delimits the lower boundary of the field of view, while the upper boundary of this field of view is determined by the rearward edge. In the illustrated embodiment, a vertical divergence angle A of about 80° is typically provided, while a horizontal divergence angle B of about 5° is typically provided. The vertical field of view in the illustrated embodiment extends from about −5° to about −85° below the horizontal. The mirror assembly can be rotated such that the lower extent of the vertical field of view lies along the mounting wall of the detection system. As a result, the mounting wall is more fully protected, and it is unlikely that an intruder could sneak behind the protected space at the mounting wall.

Figure 7:
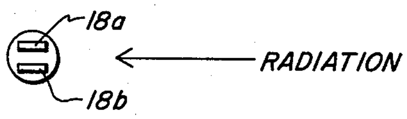
FIG. 7 is a schematic representation of a dual detector useful in the invention.

The detector 12 can be any type of infrared radiation detector such as a thermopile or pyroelectric type, and can be a dual element detector as illustrated in FIG. 7 in which the infrared sensing elements 18*a* and 18*b* are connected in electrical phase opposition to serve as a balanced dual detector. Each detector element provides a respective field of view in the horizontal plane as shown by the patterns 19 in FIG. 3. The detector elements are typically each 4 millimeters long and 0.6 millimeter wide with a separation therebetween of 1.2 millimeters. The incident radiation is along the long axis of the elements.

An intruder detection by one detector element causes a first transition in signal level, while intruder detection by the other detector element causes an opposite signal level transition. The signal level changes are processed by the electronic circuitry illustrated in typical embodiment in FIG. 15 to provide an output alarm indication. Referring to FIG. 15, the detector output signal is applied to an amplifier 50, the output of which is applied to a bipolar threshold circuit 52, and to a background disturbance indicator circuit 54. The output of the threshold circuit 52 is applied to an integrator 56, the output of which is applied to a threshold circuit 58. The output of circuit 58 is provided to alarm logic 60, the output of which is the alarm output signal which can be employed to drive an alarm 62. Alarm logic 60 also provides an output signal to an LED or other indicator 64. This indicator also receives a signal from background disturbance indicator circuit 54.

In operation, an intruder moving through the fields of view causes output pulses from the detector which, after amplification, are applied to the bipolar threshold, which provides output pulses corresponding to the pulses received thereby which exceed either the positive or negative threshold level. The output pulses from the threshold circuit 52 are integrated by integrator 56, and when the integrated signal exceeds the threshold level provided by threshold circuit 58, a signal is provided to alarm logic 60, which provides the alarm output signal. The alarm logic provides a pulsed signal to LED 64 to provide a blinking visual indication of intruder detection. The LED can also be energized in a steady manner to denote the presence of a background disturbance as sensed by circuit 54. As is known, the background disturbance indicator senses relatively slow variations in background infrared radiation in the fields of view, and when the level of such background radiation exceeds a predetermined level, the circuit 54 denotes that condition by energizing the LED.

The detector 12 can also be a single element detector which is responsive to the magnitude of received energy to provide a corresponding electrical output signal. The electrical output signal is processed to produce an alarm output in response to a predetermined change in received radiation.

The shape of the cylindrical mirror can be varied to control the system aperture to vary the system sensitivity across the viewing field. For example, the cylindrical mirror can be structured or shaped to provide lower sensitivity to objects near the detector and higher sensitivity to objects further removed from the detector. A smaller cylindrical surface area provides a smaller aperture and therefore lower sensitivity. For example, the cylindrical mirror 15 can have a perimeter of trapezoidal shape, as illustrated by dotted lines 20, to provide a smaller aperture and therefore lower sensitivity for objects closer to the mirror assembly. While the image at the detector is distorted by the cylindrical mirror, such distortion is not of any material detriment to system performance, since intruder detection is based upon the change in received radiation due to a moving intruder entering or leaving the field of view rather than precise imaging of the intruder onto the detector.

The focusing mirror can be either spherical or parabolic and preferably is of sufficient size to cover the full aperture of the cylindrical mirror without obstructing the field of view. The focusing mirror can be of circular perimeter as illustrated, or can be of square or rectangular perimeter to match the perimeter of the cylindrical mirror.

Figure 4:
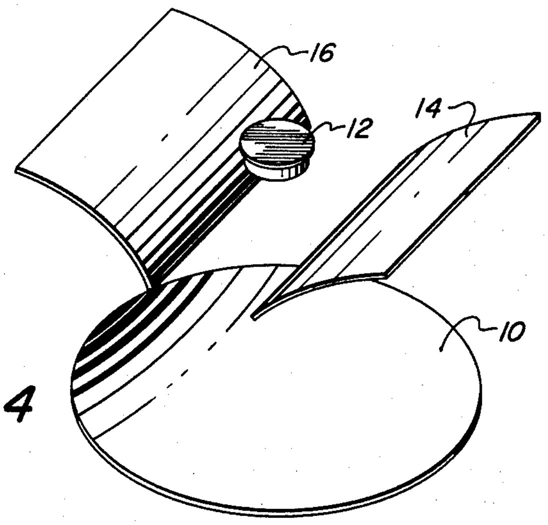
FIG. 4 is a pictorial view of an alternative embodiment of a mirror assembly in accordance with the invention for providing two viewing fields.
Figure 5:
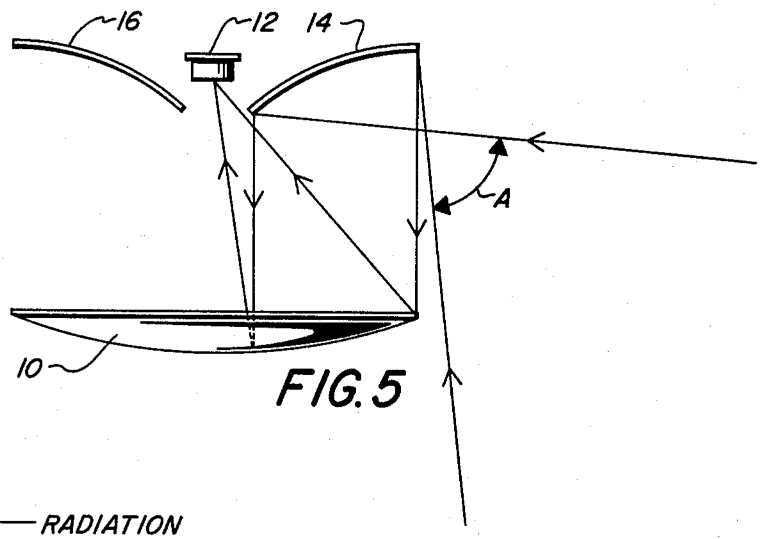
FIG. 5 is an elevation view of the mirror assembly of FIG. 4.
Figure 6:
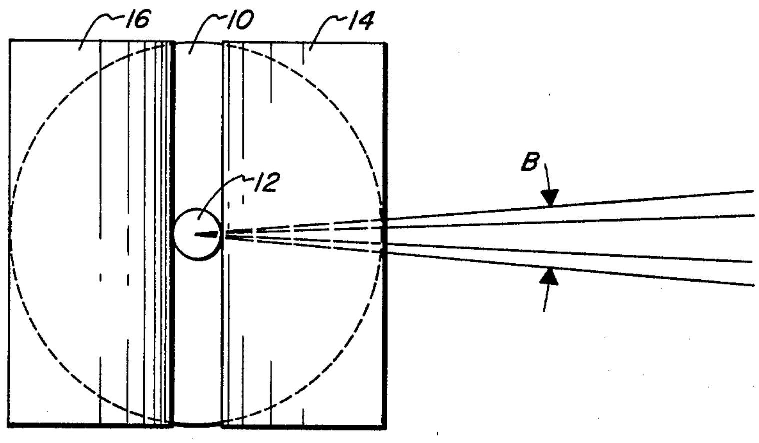
FIG. 6 is a top view of the mirror assembly of FIG. 4.

An alternative embodiment is illustrated in FIGS. 4–6 for providing two fields of view. This embodiment includes a focusing mirror 10, an infrared detector 12 disposed along the optical axis of mirror 10 and at the focus thereof, and first and second concave cylindrical mirrors 14 and 16, each oriented to provide a predetermined field of view and to cooperate with mirror 10 to direct received radiation within the associated viewing field to mirror 10 for reflection onto detector 12. This embodiment provides two field of view, each of which is relatively large in the vertical plane, as illustrated in FIG. 5, and relatively narrow in the horizontal plane, as illustrated in FIG. 6. The fields of view are controlled in the same manner as described above. Thus, the horizontal field of view is controlled by the focal length of mirror 10, and the vertical field of view is controlled by the cylindrical mirrors. In the embodiment of FIGS. 4–6, the two viewing fields are shown as being along a common axis. The two fields need not lie on a common axis but can be along respective axes which are in intended angular relationship for intended orientation of the two viewing fields. In the embodiment illustrated in FIGS. 4–6, a vertical divergence angle A of about 80° is typically provided, while a horizontal divergence angle B of about 5° is typically provided. The vertical field of view in this embodiment extends from about −5° to −85° below the horizontal.

Figure 8:
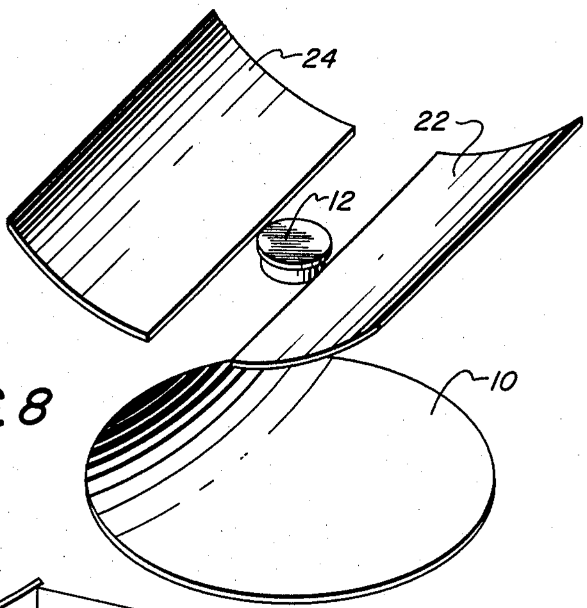
FIG. 8 is a pictorial view of a further embodiment of a mirror assembly in accordance with the invention.
Figure 9:
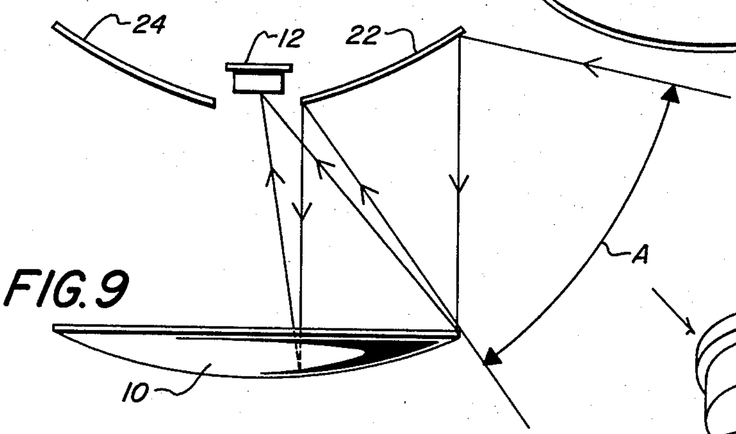
FIG. 9 is an elevation view of the mirror assembly of FIG. 8.

An alternative embodiment is illustrated in FIGS. 8 and 9 wherein a pair of convex cylindrical mirrors 22 and 24 are provided in place of the concave mirrors 14 and 16 of the embodiment just described. These convex cylindrical mirrors provide wide vertical divergence angles as illustrated, although the lookdown angle, that is, the angular extent of the field of view nearest to the edge of focusing mirror 10, is not as great as provided by the concave cylindrical mirrors 14 and 16 of the above embodiment. Operation of this embodiment is similar to that described above.

Figure 12:
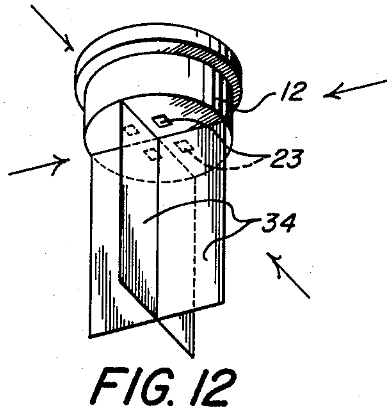
FIG. 12 is a pictorial view of a detector assembly useful in the embodiment of FIG. 10.
Figure 10:
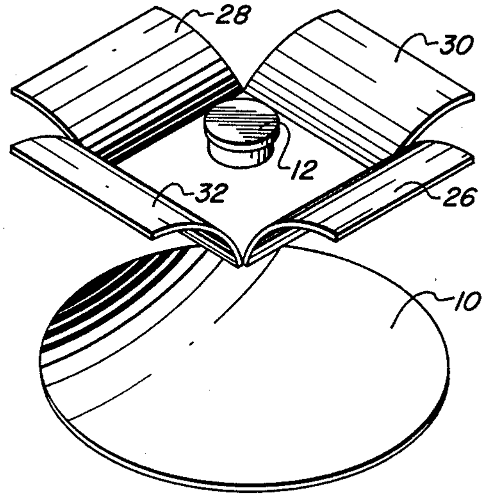
FIG. 10 is a pictorial view of another mirror assembly embodiment according to the invention for providing four viewing fields.
Figure 13:
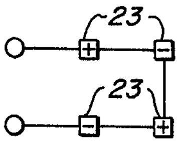
FIG. 13 is a schematic diagram of the electrical connection of the detectors.

A further embodiment is illustrated in FIGS. 10 and 11 in which a crossed pattern of four fields of view is provided by four concave cylindrical mirrors 26, 28, 30, and 32. This version provides four narrow fields of view in the horizontal plane as shown in FIG. 11, and four relatively broad fields of view in the vertical plane to provide, effectively, a crossed curtain in the protected space. Two pairs of phase opposed dual detectors are provided, with the individual detector elements 23 masked by a cross-shaped shield 34, shown in FIG. 12. Each pair of detector elements is associated with a respective field, depicted by arrows in FIG. 12, and the shield 34 prevents radiation from the opposite field pattern from impinging on this pair of detector elements. The detecting elements are connected in series phase opposition as illustrated in FIG. 13. In a typical implementation, the elements 23 are each 1 millimeter square with a 2 millimeter separation therebetween.

When a dual detector is employed, the detector geometry limits the number of fields of view which can be provided, since the detecting elements of the dual detector must both be exposed to the field of view. For an unbalanced or single detector, there is no constraint on the number of viewing fields caused by the detector geometry, and many different viewing fields can be provided in accordance with the invention by use of a plurality of cylindrical mirrors cooperative with a focusing mirror to produce an intended array of protective curtains. As an example, there is shown in FIG. 14 a spoke-like azimuth pattern of eight fields provided by a mirror assembly including a focusing mirror 10 and eight cylindrical mirrors 25 equispaced with respect to the focusing mirror. Each field of view is narrow in the horizontal plane and broad in the vertical plane in the manner described above.

Figure 16:
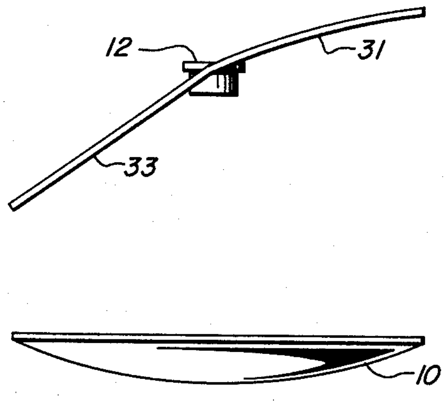
FIG. 16 is an elevation view of an alternative embodiment providing a relatively long range field of view.
Figure 17:
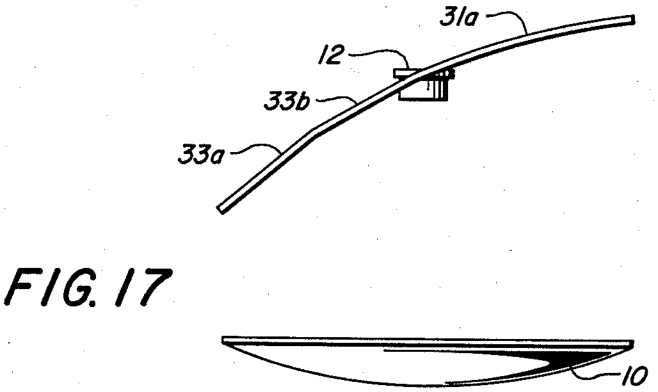
FIG. 17 is an elevation view of a variation of the embodiment of FIG. 16.
Figure 18:
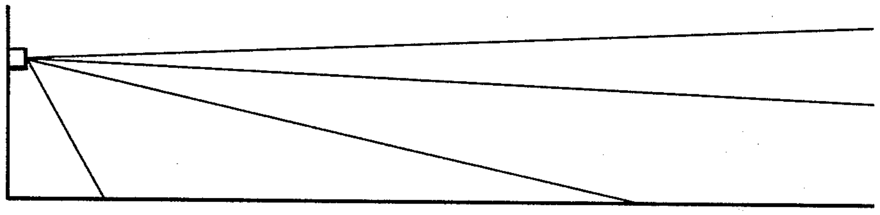
FIG. 18 is a diagrammatic representation of the vertical fields of view provided by the embodiment of FIG. 16.
Figure 19:
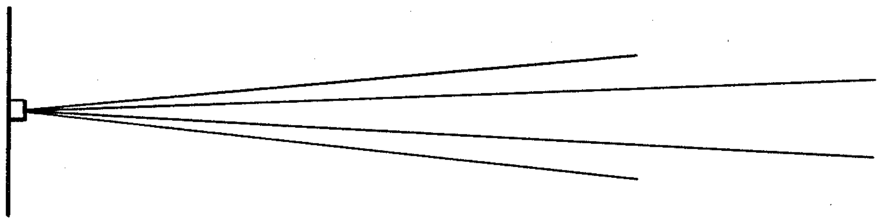
FIG. 19 is a diagrammatic representation of the horizontal fields of view provided by the embodiment of FIG. 16.

An embodiment is illustrated in FIG. 16 for providing a relatively long range field of view and useful, for example, for protection of a long corridor or hallway. This embodiment comprises a focusing mirror 10, a cylindrical mirror 31, and a plane mirror 33 disposed as illustrated. The cylindrical and plane mirrors may be part of the same reflecting element, or separate mirror elements can be employed. The plane mirror in cooperation with the focusing mirror provides a long narrow field of view in both the vertical and horizontal planes as illustrated in FIGS. 18 and 19. The cylindrical mirror in cooperation with the focusing mirror provides a broad field of view in the vertical plane as shown in FIG. 18, and a narrow field of view in the horizontal plane as shown in FIG. 19. Thus, in this embodiment, the mirror assembly provides a long range field of view and a field of view at distances closer to the detector which is substantially solid in the vertical plane such that even if an intruder were able to circumvent detection by avoidance of the long range viewing field, circumvention of the broad pattern would be difficult or impossible by reason of the vertical field of view substantially encompassing the protected space. Multiple plane mirrors 33*a* and 33*b* can be employed in a variation of this embodiment as illustrated in FIG. 17 to produce multiple longer range viewing fields.

The intrusion detector is typically housed within a small enclosure such as illustrated in FIG. 20 for the embodiment of FIGS. 1–3 providing a single viewing field. The enclosure 35 is adapted to be mounted within an opening in a wall at a high location near the ceiling. The enclosure includes a front panel 37 in which a narrow horizontal window 39 is provided. This window is transparent to radiation within the frequency band of interest and permits transmission of incident radiation from the field of view onto the detector. Since only a narrow window area is needed to accommodate the viewing field, the enclosure can be of many different esthetic forms.

Thus, the invention provides a passive infrared intrusion detection system in which one or more solid curtains of protection are provided to achieve an area of protection which cannot readily be compromised or circumvented by an intruder crawling under or jumping over the protected space. The optical aperture can be easily controlled by shaping of the cylindrical mirror surfaces to provide uniform detection sensitivity irrespective of the range of an intruder. While the invention has been described in relation to providing horizontal and vertical fields of view, it will be appreciated that the invention is equally useful in providing a broad pattern in any plane and a narrow pattern in the transverse plane. Accordingly, the invention is not to be limited by what has been particularly shown and described except as indicated in the appended claims.

What is claimed is:

1. A passive infrared intrusion detection system comprising:

a mirror assembly including a focusing mirror having a focal length providing a relatively narrow field of view in a first plane; and at least one mirror having a two dimensional surface selectively curved along one of the dimensions of the surface only and cooperative with the focusing mirror to provide a relatively large field of view in a second plane transverse to the first plane; and a detector disposed at the focus of the focusing mirror and operative to provide electrical signals in response to and representative of radiation received from the fields of view.

2. The system of claim 1 wherein said at least one mirror having a two dimensional surface selectively curved along one of the dimensions of the surface only comprises a cylindrical mirror.

3. A passive infrared intrusion detection system comprising:

at least one first mirror having a two dimensional surface selectively curved along one of the dimensions of the surface only and disposed to receive radiation from a facility being monitored;

a focusing mirror in radiation receiving relationship with said at least one first mirror;

a detector disposed at the focus of the focusing mirror and operative to provide electrical signals in response to and representative of radiation received from the fields of view;

the focusing mirror hving a focal length providing a relatively narrow field of view in a first plane; and the at least one first mirror being cooperative with the focusing mirror to provide a relatively large field of view in a second plane transverse to the first plane.

4. The system of claim 3 wherein said focusing mirror is a parabolic mirror.

5. The system of claim 3 wherein said focusing mirror is a spherical mirror.

6. The system of claim 3 wherein said at least one first mirror having a two dimensional surface relatively curved along one of the dimensions of the surface only comprises a cylindrical mirror.

7. The system of claim 6 wherein the said at least one cylindrical mirror is a cylindrical concave mirror.

8. The system of claim 6 wherein the said at least one cylindrical mirror is a cylindrical convex mirror.

9. The system of claim 6 wherein said at least one cylindrical mirror is oriented with its cylindrical axis orthogonal to the optical axis of the focusing mirror.

10. The system of claim 6 wherein the focal length of the focusing mirror determines the divergence angle of the field of view in the first plane; and wherein the curvature of the cylindrical mirror in relation to the focal length of the focusing mirror determines the divergence angle of the field of view in the second plane.

11. The system of claim 6 wherein the edges of the cylindrical mirror parallel to its cylindrical axis determine the extent of the field of view in the second plane.

12. The system of claim 11 wherein the forward edge of the cylindrical mirror parallel to the cylindrical axis delimits the lower boundary of the field of view, while the rearward edge of the cylindrical mirror parallel to the cylindrical axis delimits the upper boundary of the field of view in the second plane.

13. The system of claim 6 wherein said at least one cylindrical mirror has a perimeter shaped to define the optical aperture and sensitivity of the system.

14. The system of claim 13 wherein the at least one cylindrical mirror has a perimeter of trapezoidal shape to provide a smaller aperture and lower sensitivity for objects in the field of view closer to the mirror assembly.

15. The system of claim 6 further including at least one plane mirror contiguously disposed with said at least one cylindrical mirror to receive radiation from a facility being monitored and cooperative with the focusing mirror to provide a relatively long range narrow field of view in the first and second planes.

16. The system of claim 3 wherein said first and second planes are orthogonal to one another.

17. The system of claim 16 wherein said first plane is substantially horizontal and said second plane is substantially vertical.

18. The system of claim 17 wherein the horizontal field of view is about 5° and the vertical field of view is about 80°.

19. The system of claim 3 including first and second cylindrical mirrors, each cooperative with the focusing mirror to provide respective fields of view which are relatively large in the second plane transverse to the first plane.

20. The system of claim 19 wherein the first and second cylindrical mirrors are disposed to provide oppositely extending fields of view.

21. The system of claim 3 further including signal processing circuitry operative in response to electrical signals from the detector for providing an alarm indication of intruder detection.

22. A passive infrared intrusion detection system comprising:

- a plurality of first mirrors each having a two dimensional surface selectively curved along one of the dimensions of the surface only, each disposed to receive radiation from a respective field of view;
- a focusing mirror in radiation receiving relationsip with said plurality of first mirrors;
- the focusing mirror being cooperative with each of said first mirrors to provide a relatively narrow field of view in respective first planes and to provide a relatively large field of view in respective second planes transverse to the first planes; and
- a detector disposed at the focus of the focusing mirror and operative to provide electrical signals in response to and representative of radiation received from the fields of view.

23. The system of claim 22 wherein said detector comprises a dual element detector for respective fields of view.

24. The system of claim 23 wherein said detector includes a shield interposed between detector elements of the dual detector to prevent radiation from an opposite field of view from impinging on a pair of detector elements.

25. The system of claim 22 wherein the plurality of first mirrors are circumferentially disposed about the optical axis of the focusing mirror to provide a circumferential array of viewing fields, each of which is narrow in the first planes and large in the second planes.

26. The system of claim 25 wherein said plurality of first mirrors each having a two dimensional surface selectively curved along one of the dimensions of the surface only each comprise a cylindrical mirror.

* * * * *